United States Patent
Fan et al.

(10) Patent No.: US 10,634,034 B2
(45) Date of Patent: *Apr. 28, 2020

(54) COMMON RAIL, APPLICATION OF THE COMMON RAIL, CARBAMIDE SPRAYING SYSTEM, AND CONTROL METHOD THEREFOR

(71) Applicant: TENNECO (SUZHOU) EMISSION SYSTEM CO., LTD., Kunshan Suzhou, Jiangsu (CN)

(72) Inventors: Gaofeng Fan, Kunshan Suzhou (CN); Zhenqiu Yang, Kunshan Suzhou (CN); Haitao Zhang, Kunshan Suzhou (CN); Anzhou Wu, Kunshan Suzhou (CN); Shuai Guan, Kunshan Suzhou (CN)

(73) Assignee: TENNECO (SUZHOU) EMISSION SYSTEM CO., LTD., Jiangsu (CN)

( * ) Notice: Subject to any disclaimer, the term of this patent is extended or adjusted under 35 U.S.C. 154(b) by 142 days.

This patent is subject to a terminal disclaimer.

(21) Appl. No.: 15/528,413

(22) PCT Filed: Nov. 12, 2015

(86) PCT No.: PCT/CN2015/094452
§ 371 (c)(1),
(2) Date: May 19, 2017

(87) PCT Pub. No.: WO2016/078540
PCT Pub. Date: May 26, 2016

(65) Prior Publication Data
US 2017/0335736 A1 Nov. 23, 2017

(30) Foreign Application Priority Data
Nov. 21, 2014 (CN) .......................... 2014 1 0671572

(51) Int. Cl.
*F01N 3/28* (2006.01)
*F01N 3/021* (2006.01)
*F01N 9/00* (2006.01)

(52) U.S. Cl.
CPC ............... *F01N 3/28* (2013.01); *F01N 3/021* (2013.01); *F01N 9/00* (2013.01); *F01N 2560/06* (2013.01); *F01N 2610/02* (2013.01); *Y02T 10/47* (2013.01)

(58) Field of Classification Search
CPC ... F01N 3/021; F01N 3/28; F01N 9/00; F01N 2560/06; F01N 2610/02; Y02T 10/47
See application file for complete search history.

(56) References Cited

U.S. PATENT DOCUMENTS

| 3,596,640 A | 8/1971 | Bloomfield |
| 3,908,371 A | 9/1975 | Nagai et al. |

(Continued)

FOREIGN PATENT DOCUMENTS

| CN | 101084053 A | 12/2007 |
| CN | 101493027 A | 7/2009 |

(Continued)

OTHER PUBLICATIONS

European Search Report, dated Jul. 3, 2018.

*Primary Examiner* — Brandon D Lee
(74) *Attorney, Agent, or Firm* — Harness, Dickey & Pierce, P.L.C.

(57) ABSTRACT

A common rail comprises a shell and a pressure detection apparatus and a pressure adjustment apparatus that are installed on the shell. The shell comprises an inlet passage, an outlet passage, at least one conveyance port that is connected to the inlet passage, and at least one flow return port that is connected to the outlet passage. The pressure detection apparatus is connected to the inlet passage. The pressure adjustment apparatus is connected between the inlet (Continued)

passage and the outlet passage. The pressure adjustment apparatus can connect or disconnect the inlet passage and the outlet passage. Also disclosed is a carbamide spraying system having such a common rail. Because a carbamide solution returned from a nozzle is first gathered inside the common rail and then returns to a carbamide tank through the outlet passage and a return flow pipe, the length of the return flow pipe is reduced. Further disclosed are an application of a common rail in a diesel engine exhaust processing system, a carbamide spraying system, and a control method for a carbamide spraying system.

11 Claims, 16 Drawing Sheets

(56) References Cited

U.S. PATENT DOCUMENTS

| | | | |
|---|---|---|---|
| 5,522,218 A | 6/1996 | Lane et al. | |
| 5,976,475 A | 11/1999 | Peter-Hoblyn et al. | |
| 6,006,515 A | 12/1999 | Wakamoto | |
| 6,125,629 A | 10/2000 | Patchett | |
| 6,182,444 B1 | 2/2001 | Fulton et al. | |
| 6,293,097 B1 | 9/2001 | Wu et al. | |
| 6,761,025 B1 | 7/2004 | Gladden | |
| 6,820,417 B2 | 11/2004 | May et al. | |
| 6,877,312 B2 | 4/2005 | Nakatani et al. | |
| 6,941,746 B2 | 9/2005 | Tarabulski et al. | |
| 7,014,930 B2 | 3/2006 | Daniel et al. | |
| 7,021,048 B2 | 4/2006 | Taylor, III et al. | |
| 7,040,290 B2 | 5/2006 | Kim | |
| 7,264,785 B2 | 9/2007 | Blakeman et al. | |
| 7,587,890 B2 | 9/2009 | Stroia et al. | |
| 7,748,364 B2 | 7/2010 | Hanneke et al. | |
| 7,799,289 B2 | 9/2010 | Robel | |
| 7,827,962 B2 | 11/2010 | Weizenauer et al. | |
| 7,895,829 B2 | 3/2011 | Suzuki et al. | |
| 8,056,577 B2 | 11/2011 | Street et al. | |
| 8,109,077 B2 | 2/2012 | Reba et al. | |
| 8,122,709 B2 | 2/2012 | Buerglin et al. | |
| 8,171,722 B2 | 5/2012 | Rodman et al. | |
| 8,353,153 B2 | 1/2013 | Kotrba et al. | |
| 8,381,514 B2 | 2/2013 | Salanta et al. | |
| 8,397,491 B2 | 3/2013 | Bauer et al. | |
| 8,402,750 B2 | 3/2013 | Floyd et al. | |
| 8,424,292 B2 | 4/2013 | Hoyte et al. | |
| 8,470,274 B2 | 6/2013 | Maus et al. | |
| 8,551,432 B2 | 10/2013 | Adelman et al. | |
| 8,590,291 B2 | 11/2013 | Kasahara | |
| 8,615,990 B2 | 12/2013 | Wilhelm et al. | |
| 8,635,854 B2 | 1/2014 | Shovels et al. | |
| 8,635,855 B2 | 1/2014 | Mital et al. | |
| 8,656,703 B2 | 2/2014 | Nakamura | |
| 8,661,785 B2 | 3/2014 | Levin et al. | |
| 8,671,663 B2 | 3/2014 | Buerglin et al. | |
| 8,701,389 B2 | 4/2014 | Thomas et al. | |
| 8,863,501 B2 | 10/2014 | Reusing et al. | |
| 8,875,499 B2 | 11/2014 | Kawada et al. | |
| 8,904,760 B2 | 12/2014 | Mital | |
| 8,910,884 B2 | 12/2014 | Thomas et al. | |
| 8,920,757 B1 | 12/2014 | Chandrapati et al. | |
| 8,938,949 B2 | 1/2015 | Branco et al. | |
| 8,943,808 B2 | 2/2015 | Li et al. | |
| 8,997,461 B2 | 4/2015 | Henry et al. | |
| 9,010,096 B2 | 4/2015 | Golin et al. | |
| 9,068,487 B2 | 6/2015 | Minezawa et al. | |
| 9,080,487 B2 | 7/2015 | Golin et al. | |
| 9,132,386 B2 | 9/2015 | Udd et al. | |
| 9,162,183 B2 | 10/2015 | Ancimer et al. | |
| 9,169,760 B2 | 10/2015 | Maguin et al. | |
| 9,192,892 B2 | 11/2015 | Nunez et al. | |
| 9,222,388 B2 | 12/2015 | Kregling et al. | |
| 9,222,390 B2 | 12/2015 | Gottwald | |
| 9,273,577 B2 | 3/2016 | Ancimer | |
| 9,387,437 B2 | 7/2016 | Hogan et al. | |
| 9,394,819 B2 | 7/2016 | Nishizawa | |
| 9,403,566 B2 | 8/2016 | Jacobsen et al. | |
| 9,458,746 B2 | 10/2016 | Naik et al. | |
| 9,512,763 B2 | 12/2016 | Hudgens et al. | |
| 9,528,413 B2 | 12/2016 | Katare et al. | |
| 9,539,546 B2 | 1/2017 | Nishizawa et al. | |
| 9,546,584 B2 | 1/2017 | Qi | |
| 9,567,888 B2 | 2/2017 | Gupta et al. | |
| 9,599,013 B2 | 3/2017 | Ahrns | |
| 9,689,291 B2 | 6/2017 | Zhang et al. | |
| 9,719,395 B2 | 8/2017 | Overhoff et al. | |
| 9,869,226 B2 | 1/2018 | Broderick et al. | |
| 9,890,678 B2 | 2/2018 | Qi | |
| 10,180,096 B2 | 1/2019 | Fan | |
| 10,202,883 B2 | 2/2019 | Yang et al. | |
| 10,260,391 B2 | 4/2019 | Nilsson et al. | |
| 2004/0098978 A1 | 5/2004 | Tarabulski et al. | |
| 2004/0118109 A1 | 6/2004 | Gladden | |
| 2004/0177606 A1* | 9/2004 | Scharsack | F01N 3/2066 60/286 |
| 2005/0069468 A1* | 3/2005 | Huber | F01N 3/2066 422/172 |
| 2005/0069476 A1 | 3/2005 | Blakeman et al. | |
| 2006/0196169 A1 | 9/2006 | Ripper et al. | |
| 2007/0215209 A1 | 9/2007 | Street et al. | |
| 2008/0028751 A1 | 2/2008 | Stroia et al. | |
| 2008/0087008 A1 | 4/2008 | Reba et al. | |
| 2008/0092531 A1 | 4/2008 | Suzuki et al. | |
| 2008/0282680 A1 | 11/2008 | Tachy et al. | |
| 2009/0025373 A1 | 1/2009 | Buerglin et al. | |
| 2009/0035195 A1 | 2/2009 | Robel | |
| 2009/0145400 A1 | 6/2009 | Hanneke et al. | |
| 2009/0205316 A1 | 8/2009 | Dougnier et al. | |
| 2009/0223486 A1 | 9/2009 | Weizenauer et al. | |
| 2010/0139260 A1 | 6/2010 | Rodman et al. | |
| 2010/0242439 A1 | 9/2010 | Domon et al. | |
| 2010/0319320 A1 | 12/2010 | Mital et al. | |
| 2010/0319324 A1 | 12/2010 | Mital | |
| 2011/0000196 A1 | 1/2011 | Kasahara | |
| 2011/0047973 A1 | 3/2011 | Wilhelm et al. | |
| 2011/0146249 A1 | 6/2011 | Palluat de Besset et al. | |
| 2011/0154806 A1 | 6/2011 | Hoyte et al. | |
| 2011/0162347 A1 | 7/2011 | Katare et al. | |
| 2011/0197569 A1 | 8/2011 | Salanta et al. | |
| 2011/0203261 A1 | 8/2011 | Kotrba et al. | |
| 2012/0036842 A1 | 2/2012 | Nakamura | |
| 2012/0039779 A1 | 2/2012 | Maus et al. | |
| 2012/0131910 A1 | 5/2012 | Reusing et al. | |
| 2012/0260629 A1 | 10/2012 | Levin et al. | |
| 2013/0031890 A1 | 2/2013 | Shovels et al. | |
| 2013/0067892 A1 | 3/2013 | Minezawa et al. | |
| 2013/0118155 A1 | 5/2013 | Domon et al. | |
| 2013/0140383 A1 | 6/2013 | Thomas et al. | |
| 2013/0171050 A1 | 7/2013 | Adelman et al. | |
| 2013/0232958 A1 | 9/2013 | Ancimer et al. | |
| 2013/0299604 A1 | 11/2013 | Thomas et al. | |
| 2013/0343959 A1 | 12/2013 | Golin et al. | |
| 2014/0047821 A1 | 2/2014 | Kawada et al. | |
| 2014/0053539 A1 | 2/2014 | Golin et al. | |
| 2014/0116027 A1 | 5/2014 | Ancimer | |
| 2014/0116545 A1 | 5/2014 | Gottwald | |
| 2014/0238504 A1 | 8/2014 | Kregling et al. | |
| 2014/0245722 A1 | 9/2014 | Naik et al. | |
| 2014/0360168 A1 | 12/2014 | Broderick et al. | |
| 2014/0363358 A1 | 12/2014 | Udd et al. | |
| 2015/0047327 A1 | 2/2015 | Overhoff et al. | |
| 2015/0052878 A1 | 2/2015 | Qi | |
| 2015/0096287 A1 | 4/2015 | Qi | |
| 2015/0167526 A1 | 6/2015 | Henry et al. | |
| 2015/0196878 A1 | 7/2015 | Nunez et al. | |
| 2015/0204226 A1 | 7/2015 | Moore | |
| 2015/0224447 A1 | 8/2015 | Nishizawa et al. | |
| 2015/0252707 A1 | 9/2015 | Nishizawa | |
| 2015/0275730 A1 | 10/2015 | Gupta et al. | |
| 2015/0336052 A1 | 11/2015 | Hogan et al. | |
| 2016/0040575 A1 | 2/2016 | Zhang et al. | |
| 2016/0047285 A1 | 2/2016 | Alcini et al. | |
| 2016/0160725 A1 | 6/2016 | Hudgens et al. | |

(56) References Cited

U.S. PATENT DOCUMENTS

| | | | |
|---|---|---|---|
| 2016/0230720 A1 | 8/2016 | Hackett et al. | |
| 2017/0021881 A1 | 1/2017 | Jacobsen et al. | |
| 2017/0082003 A1 | 3/2017 | Nilsson | |
| 2017/0122172 A1 | 5/2017 | Fan | |
| 2017/0218812 A1 | 8/2017 | Nilsson et al. | |
| 2017/0218813 A1 | 8/2017 | Nilsson et al. | |

FOREIGN PATENT DOCUMENTS

| | | | | |
|---|---|---|---|---|
| CN | 101737133 A | 6/2010 | | |
| CN | 101892888 A | 11/2010 | | |
| CN | 102713179 A | 10/2012 | | |
| CN | 102906385 A | 1/2013 | | |
| CN | 103348106 A | 10/2013 | | |
| CN | 104074740 A | 10/2014 | | |
| CN | 104110293 A | 10/2014 | | |
| CN | 104428503 A | 3/2015 | | |
| CN | 204267135 U | 4/2015 | | |
| CN | 204267138 U | 4/2015 | | |
| CN | 204312169 U | 5/2015 | | |
| CN | 104763497 A | 7/2015 | | |
| CN | 204646374 U | 9/2015 | | |
| CN | 105026714 A | 11/2015 | | |
| DE | 19947197 A1 | 4/2001 | | |
| DE | 10349143 A1 | 5/2005 | | |
| DE | 102006007554 A1 | 8/2007 | | |
| DE | 102010029340 A1 | 12/2011 | | |
| DE | 102012005486 A1 | 9/2013 | | |
| EP | 1676628 A1 | 7/2006 | | |
| EP | 1752632 A1 | 2/2007 | | |
| EP | 2568135 A1 | 3/2013 | | |
| JP | 2006170013 A | 6/2006 | | |
| JP | 2007327377 A | 12/2007 | | |
| JP | 2008261237 A | 10/2008 | | |
| JP | 4430524 B2 | 3/2010 | | |
| JP | 2014020310 A | 2/2014 | | |
| WO | WO-2013123865 A1 | * | 8/2013 | ........... F01N 3/2066 |

\* cited by examiner

COMMON RAIL, APPLICATION OF THE COMMON RAIL, CARBAMIDE SPRAYING SYSTEM, AND CONTROL METHOD THEREFOR

CROSS REFERENCE TO RELATED APPLICATIONS

This application is a U.S. National Phase Application under 35 U.S.C. 371 of International Application No. PCT/CN2015/094452 filed on Nov. 12, 2015 and published in Chinese as WO 2016/078540 A1 on May 26, 2016. This application is based on and claims the benefit of priority from Chinese Patent Application No. 201410671572.2 filed Nov. 21, 2014. The entire disclosures of all of the above applications are incorporated herein by reference.

TECHNICAL FIELD

The present invention relates to a common rail, the application of the common rail, a urea spraying system having the common rail, and a control method therefor, and in particular relates to a common rail, the application of the common rail, a urea spraying system having the common rail, and a control method therefor in the exhaust treatment system of high-power engines.

BACKGROUND ART

The common-rail system has been applied for a long time in the fuel injection system of engines. The structure of the common rail for fuel injection is greatly constrained because it needs to withstand a high pressure. Since a cylindrical structure can withstand a higher pressure than other structures, the cylindrical structure is adopted for almost all existing common rails for fuel injection.

As the standards for exhaust emission in countries all over the world are increasingly becoming more strict, more requirements are put forward for the urea spraying system used for exhaust treatment. How to control the pressure in the urea spraying system is a common technical problem in the industry.

In addition, for exhaust treatment of a high-power engine, the pipeline of the urea spraying system is often very long and the pressure loss is relatively great, and therefore it is necessary to provide a common rail which can stabilize the system pressure, the application of the common rail, a urea spraying system having the common rail, and a control method therefor.

SUMMARY OF THE INVENTION

The objective of the present invention is to provide a common rail which can be used in a urea spraying system to stabilize the system pressure, the application of the common rail, a urea spraying system having the common rail, and a control method therefor.

To achieve the above-mentioned objective, the following technical solution is adopted for the present invention: a common rail, used in a urea spraying system, said common rail comprising a shell, and a pressure detection apparatus and a pressure adjustment apparatus installed on said shell; said shell comprising an inlet passage, an outlet passage, at least one conveyance port connected to said inlet passage, and at least one return flow port connected to said outlet passage; said pressure detection apparatus being connected to said inlet passage; said pressure adjustment apparatus being connected between said inlet passage and said outlet passage, and said pressure adjustment apparatus being able to connect or disconnect said inlet passage and said outlet passage.

As a further improved technical solution of the present invention, said shell roughly takes the shape of a cuboid, and comprises a first end face, a second end face, a third end face, and a fourth end face, wherein said first end face is set opposite said second end face, and said third end face is set opposite said fourth end face; said inlet passage and said outlet passage run through said first end face and/or second end face, said conveyance port runs through said third end face, and said return flow port runs through said fourth end face.

As a further improved technical solution of the present invention, a plurality of said conveyance ports are provided, and said common rail is equipped with conveyance connectors connected to each conveyance port; a plurality of said return flow ports are provided, and said common rail is equipped with return flow connectors connected to each return flow port; wherein the number of said return flow connectors is the same as the number of said conveyance connectors.

As a further improved technical solution of the present invention, said conveyance connectors are arranged at intervals between said first end face and said second end face, said return flow connectors are also arranged at intervals between said first end face and said second end face, said conveyance connectors are in the opposite direction to said return flow connectors, and each conveyance port is aligned with the corresponding return flow port.

As a further improved technical solution of the present invention, a urea mass sensor is installed on at least one conveyance connector.

As a further improved technical solution of the present invention, said inlet passage and said outlet passage are parallel to each other, said conveyance connector is perpendicular to said inlet passage, and said return flow connector is perpendicular to said outlet passage.

As a further improved technical solution of the present invention, said common rail comprises an inlet connector connected to said inlet passage and an outlet connector connected to said outlet passage.

As a further improved technical solution of the present invention, said pressure detection apparatus is a pressure sensor, said pressure sensor is installed on said second end face, and said inlet connector and said outlet connector are installed on said first end face and/or said second end face.

As a further improved technical solution of the present invention, said second end face is equipped with a threaded hole, said common rail comprises a fastening piece which is held on the outside of said pressure sensor, and said fastening piece is locked together with said threaded hole through a bolt to fasten said pressure sensor onto said shell.

As a further improved technical solution of the present invention, said shell further comprises a front face perpendicular to said first, second, third, and fourth end faces, and a back face opposite said front face, wherein a mounting hole is provided at each of the four corners of said front face.

As a further improved technical solution of the present invention, said shell further comprises a front face perpendicular to said first, second, third, and fourth end faces, and a back face opposite said front face, wherein a mounting hole is provided at each of the four corners of said front face.

As a further improved technical solution of the present invention, said shell further comprises a front face perpendicular to said first, second, third, and fourth end faces, and a back face opposite said front face, wherein a mounting groove used for mounting said pressure adjustment apparatus is set on said back face.

As a further improved technical solution of the present invention, said pressure adjustment apparatus is a pressure control valve, and said pressure control valve is opened when said pressure sensor detects that the pressure is greater than a set value.

The present invention further relates to the application of the above-mentioned common rail in the exhaust treatment system of a diesel engine with a power rating above 500 kilowatts.

The present invention further relates to a urea spraying system used for treating exhaust of engines. Said urea spraying system comprises a urea tank, a fluid conveyance apparatus used to pump out urea solution in said urea tank, a common rail connected to said fluid conveyance apparatus, nozzles connected to said common rail, an outlet passage connected to said common rail, a return flow pipeline connected to said urea tank, and a controller, said fluid conveyance apparatus comprises a pump used to pump a urea solution, and said common rail is a common rail having the above-mentioned structure, wherein said nozzles are equipped with conveyance pipelines connected to said conveyance ports, and return flow pipelines connected to said return flow ports.

As a further improved technical solution of the present invention, a plurality of nozzles are provided.

As a further improved technical solution of the present invention, said engine is a high-power engine with a power rating above 500 kilowatts.

The present invention further relates to a control method of the above-mentioned urea spraying system, which comprises the following steps:

S1: The urea spraying system is started and said pump starts to work; said controller controls the opening of said pressure adjustment apparatus to connect said inlet passage and said outlet passage, and said pump quickly discharges the residual air in the pipeline of said urea spraying system into said urea tank.

S2: Said pressure detection apparatus detects the pressure in said inlet passage, sends a detection signal to said controller, and said controller adjusts the opening angle of said pressure adjustment apparatus according to the signal and adjusts the pressure in said urea spraying system to a set pressure.

As a further improved technical solution of the present invention, the control method further comprises the following step after Step S2:

S3: Before said urea spray system stops, said controller opens said pressure adjustment apparatus, said pump contra-rotates to draw the air in said urea tank into the pipeline of said urea spraying system to evacuate the urea solution from said pipeline.

Compared with the prior art, the common rail in the present invention is equipped with an inlet passage where a urea solution enters, and an outlet passage where the urea solution flows out, and said pressure adjustment apparatus can connect or disconnect said inlet passage and said outlet passage to adjust the system pressure. In addition, since said outlet passage is integrated in said common rail, the urea solution returning from nozzles first gathers in the common rail, and then returns via the outlet passage and the return flow pipeline to the urea tank. Compared with solutions where a return flow pipeline is directly introduced from each nozzle to the urea tank, the solution in the present invention can reduce the length of the return flow pipeline.

In addition, the control method for the urea spraying system of the present invention in controlling the pressure adjustment apparatus can build up the pressure very quickly, thus greatly improving the efficiency and stability of the system.

DESCRIPTION OF THE PARTICULAR EMBODIMENTS

Figure 1:
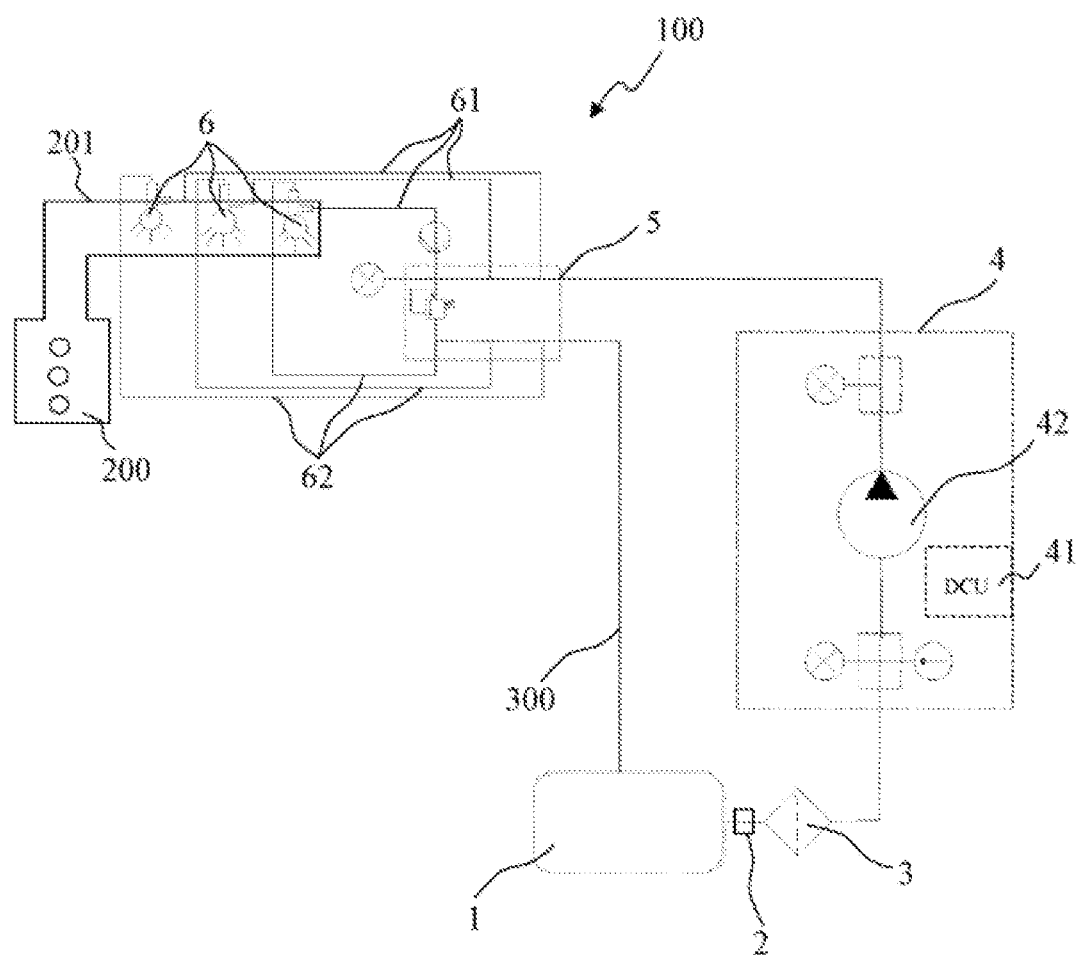
FIG. 1 is a schematic diagram for the urea spraying system used for exhaust treatment of engines.

As shown in FIG. 1, the present invention discloses a urea spraying system (100), which can be applied in the exhaust treatment of an engine (200). Said urea spraying system (100) comprises a urea tank (1), a sensor integration apparatus (2) connected to said urea tank (1), a filter (3) connected downstream of said sensor integration apparatus (2), a fluid conveyance apparatus (4) used to pump a urea solution out of said urea tank (1), a common rail (5) connected said fluid conveyance apparatus (4), and nozzles (6) connected to said common rail (5). Said fluid conveyance apparatus (4) comprises a pump (42) used to pump a urea solution from said urea tank (1) and a controller (41) used to control said urea spraying system (100). In the illustrated implementation mode of the present invention, said controller (41) is set in said fluid conveyance device (4). Of course, said controller (41) can also be set in other places in other implementation modes of the present invention.

Said engine (200) is a high-power diesel engine with a power rating above 500 kilowatts. Accordingly, it can be understood that the present invention relates to a common rail (5) applied in a high-power diesel engine. Since the power of said engine (200) is high, a plurality of said nozzles (6) are provided to realize a satisfactory exhaust treatment effect in the illustrated implementation mode of the present invention. Under the control of said controller (41), said nozzles (6) are used to spray a urea solution into the exhaust pipe (201). The atomized urea solution is decomposed into ammonia in said exhaust pipe (201), and said ammonia can react with nitrogen oxides in the engine exhaust to reduce the emission of nitrogen oxides. Considering that the principle of exhaust treatment technology is known to those skilled in the art, detailed description of it is omitted here.

As shown in FIG. 2 to FIG. 8, said common rail (5) is used to adjust the pressure in the urea spraying system. To be specific, said common rail (5) comprises a monolithic block or shell (50), a pressure detection apparatus (51) and a pressure adjustment apparatus (52) installed on said shell (50), an inlet connector (53) connected to said fluid conveyance apparatus (4) with a high-pressure pipeline, and an outlet connector (54) connected to said urea tank (1) with a return flow pipeline (300).

Figure 2:
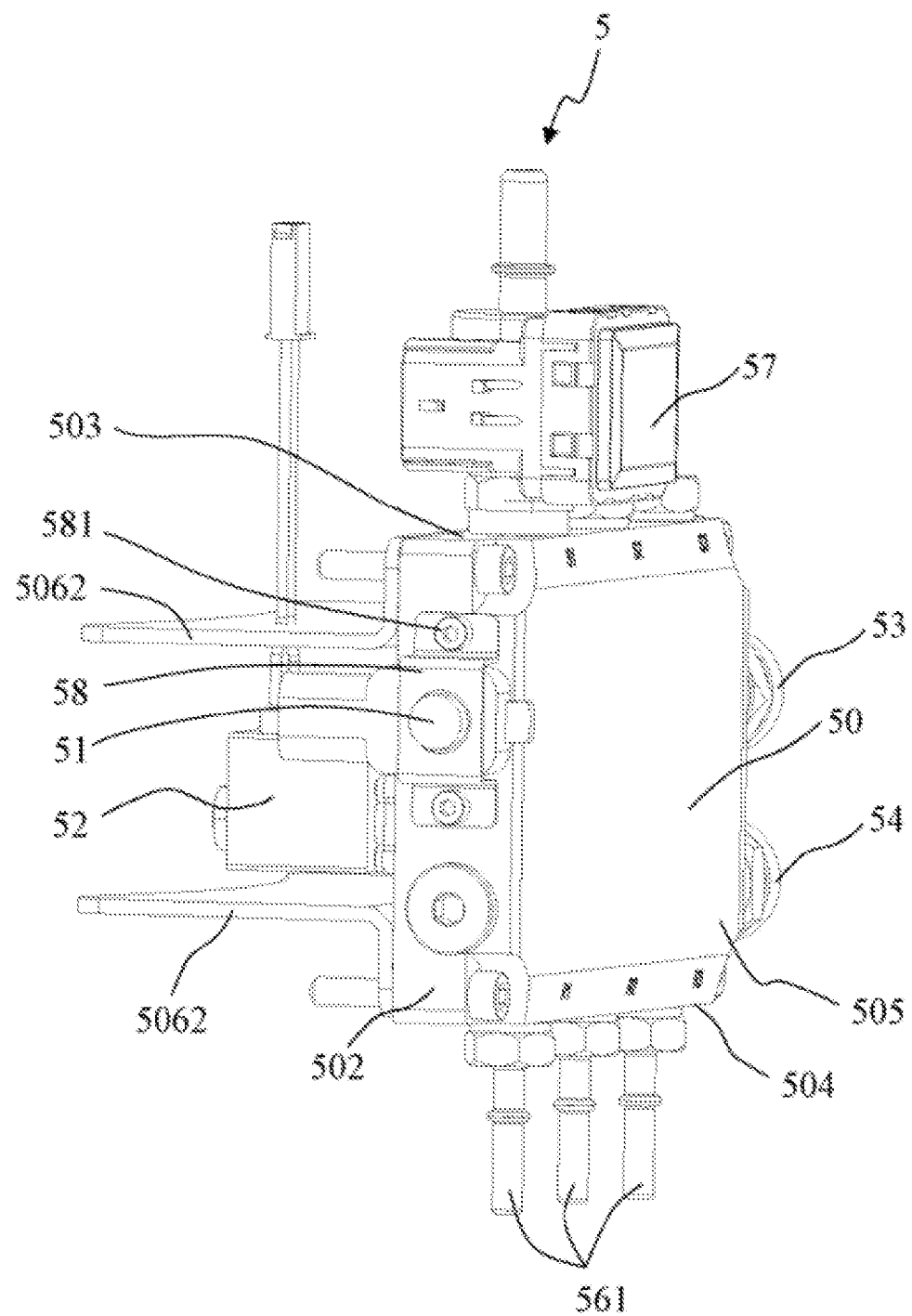
FIG. 2 is a 3-D view of the common rail shown in FIG. 1.
Figure 3:
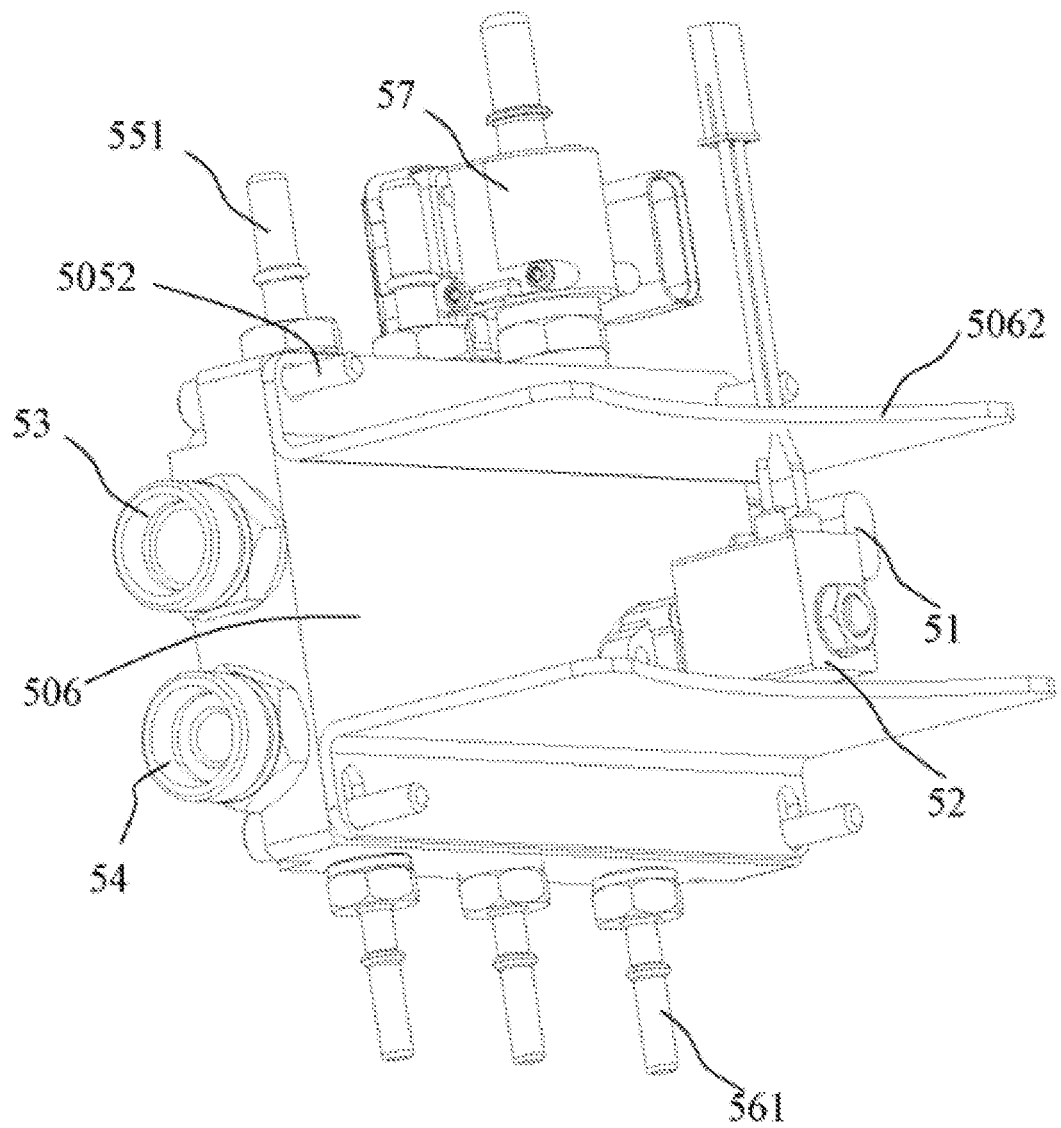
FIG. 3 is a 3-D view of another angle in FIG. 2.
Figure 4:
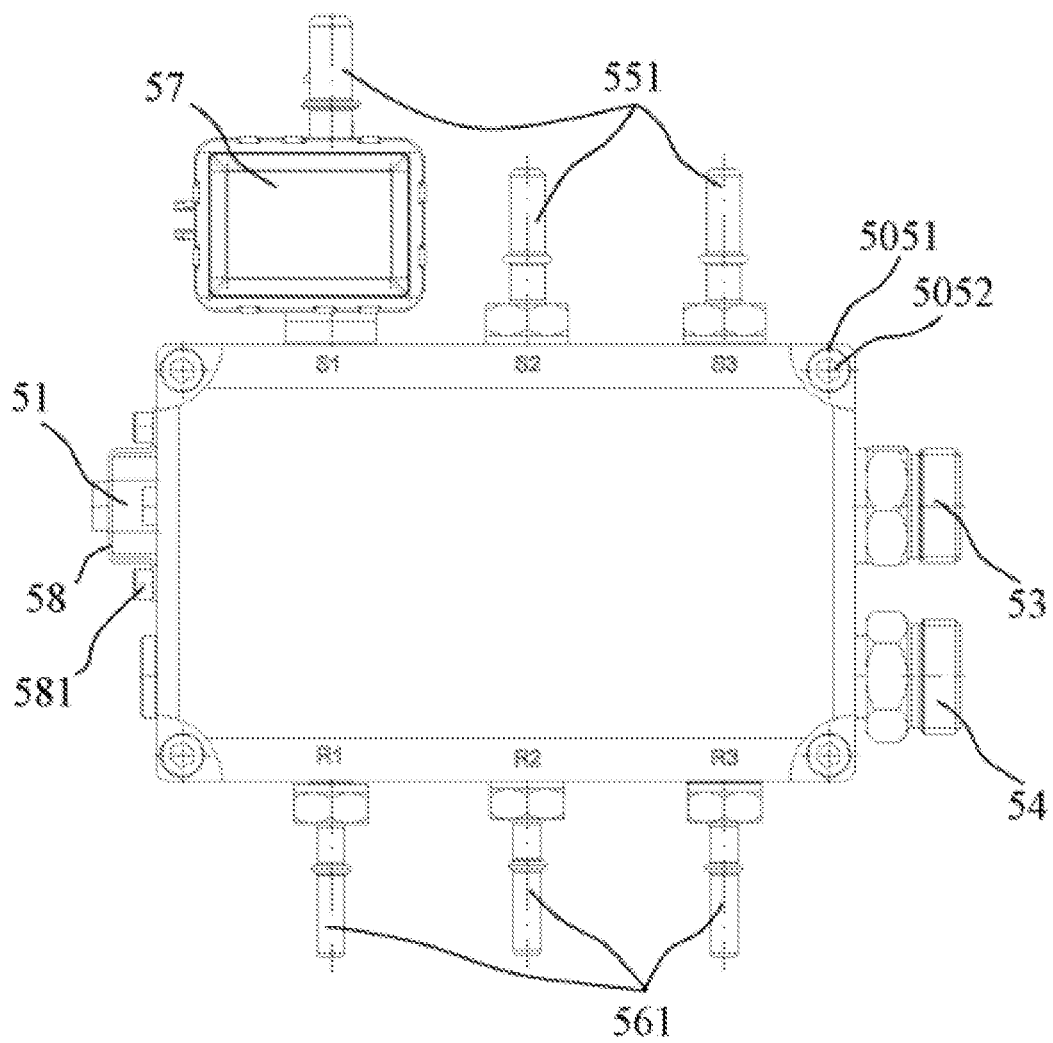
FIG. 4 is a front view of the common rail of the present invention.
Figure 5:
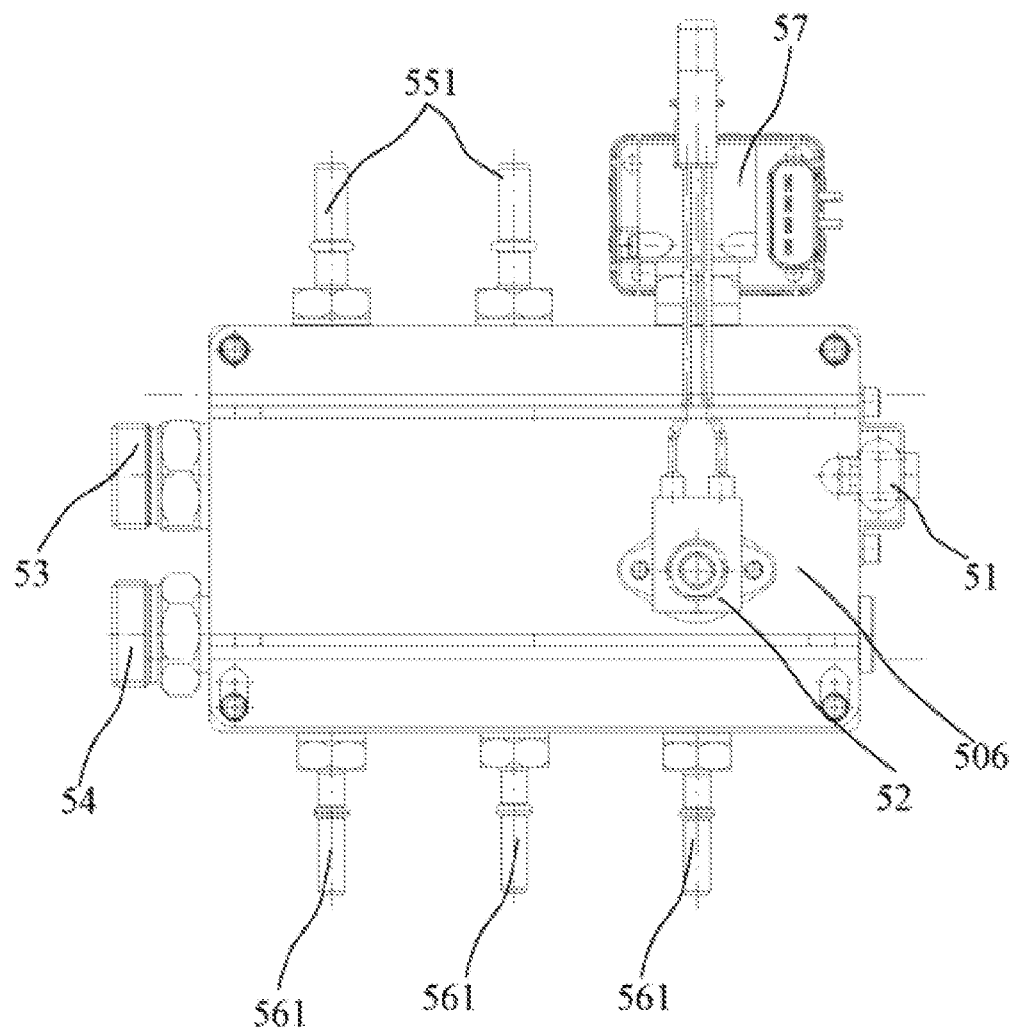
FIG. 5 is a rear view of the common rail of the present invention.
Figure 6:
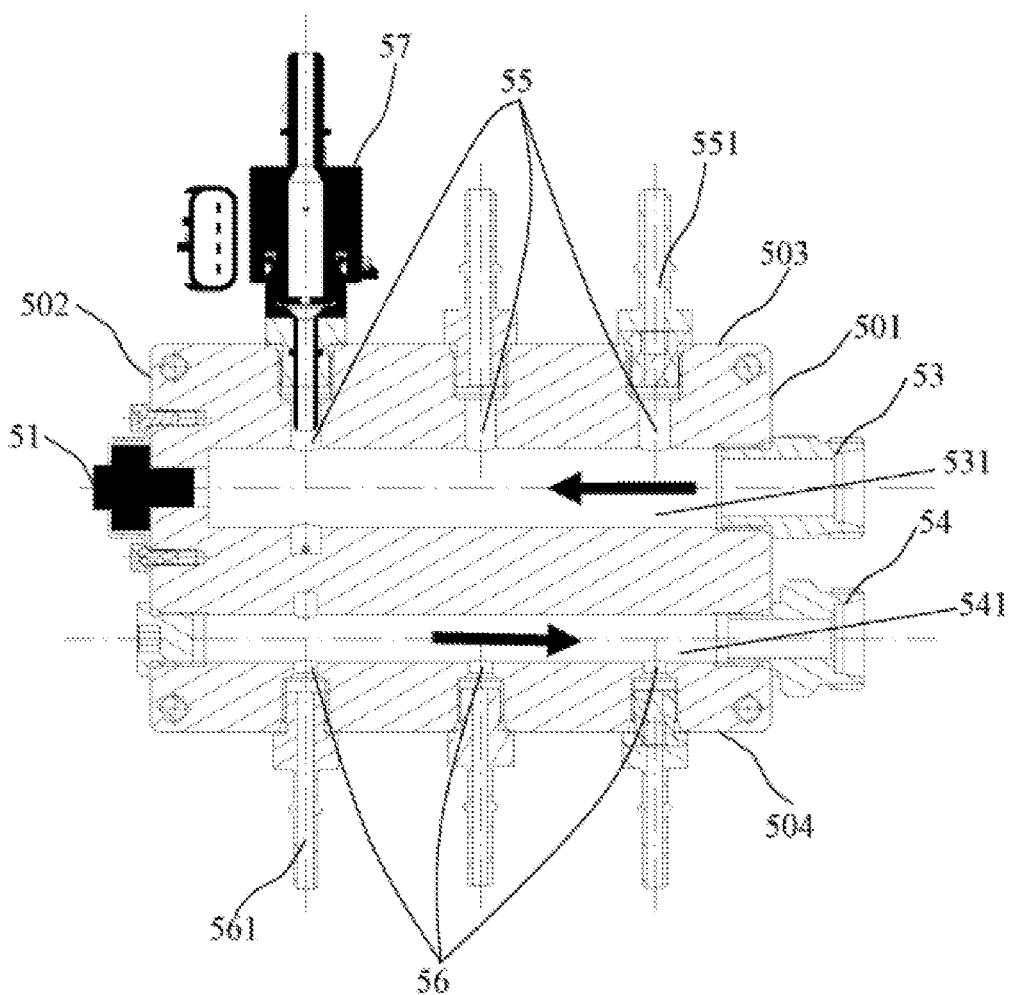
FIG. 6 is a cutaway view of the common rail of the present invention.
Figure 8:
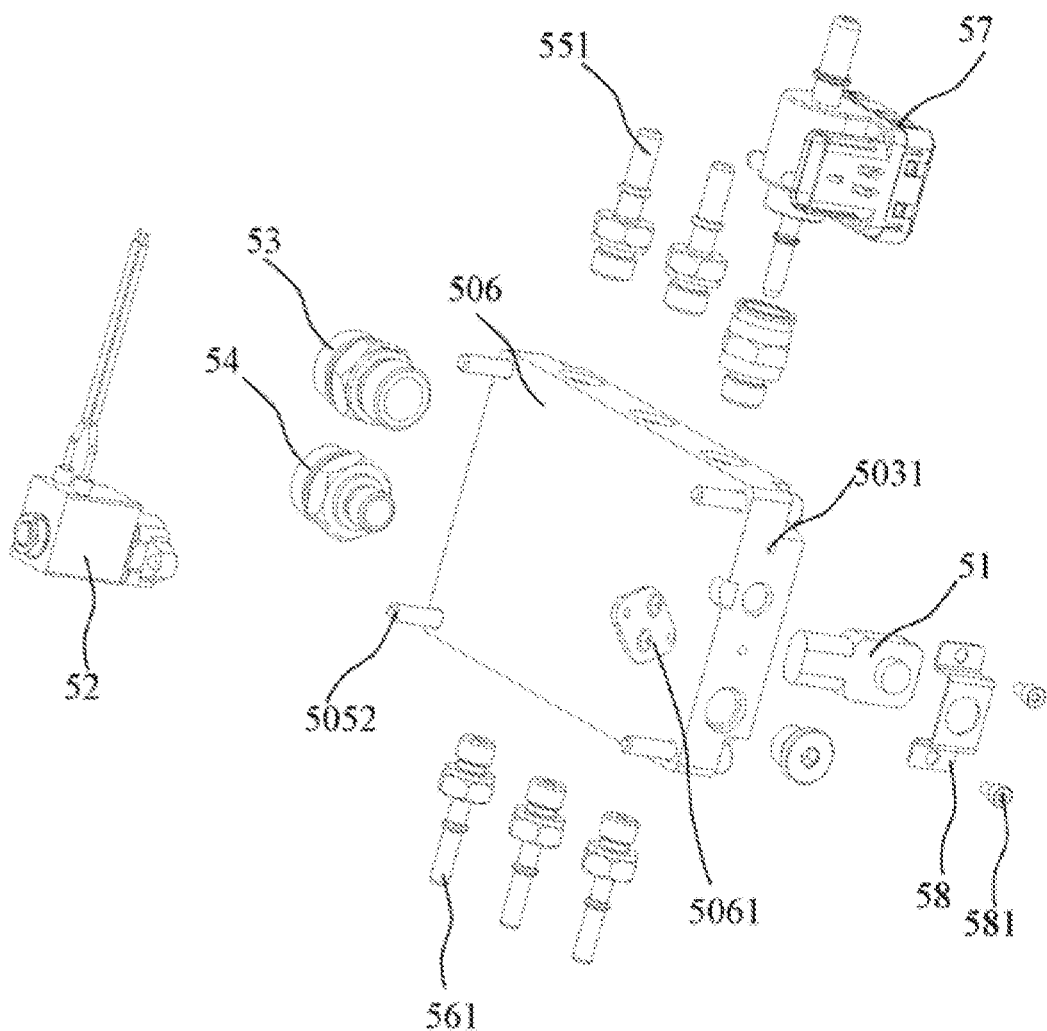
FIG. 8 is an exploded 3-D view of another angle in FIG. 7.

As shown in FIG. 6, said shell (50) roughly takes the shape of a cuboid, and comprises a first end face (501), a second end face (502), a third end face (503), a fourth end face (504), a front face (505), and a back face (506) opposite said front face, wherein said first end face (501) is set opposite said second end face (502); said third end face (503) is set opposite said fourth end face (504); said front face (505) is perpendicular to all of said first end face (501), second end face (502), third end face (503), and fourth end face (504). As shown in FIG. 4, a mounting hole (5051) is provided at each of the four corners of said front face (505). As shown in FIG. 8 and FIG. 2, a mounting groove (5061) and a pair of mounting plates (5062) located on the two sides of said mounting groove (5061) are provided on said back face (506). Said common rail (5) is further equipped with screws (5052) used to lock with said mounting holes (5051) to fasten said common rail (5) onto said mounting plates (5062). Said inlet connector (53) and said outlet connector (54) are installed on said first end face (501) and/or said second end face (502). In the illustrated implementation mode of the present invention, said inlet connector (53) and said outlet connector (54) are installed on said first end face (501). Said second end face (502) is equipped with threaded holes (5021), and in the illustrated implementation mode of the present invention, said pressure detection apparatus (51) is a pressure sensor, and is installed on said second end face (502) and connects said inlet passage (531). In the illustrated implementation mode of the present invention, said pressure adjustment apparatus (52) is a pressure control valve, and is installed in said mounting groove (5061) and is located between said mounting plates (5062). With such settings, said mounting plates (5062) can protect said pressure control valve. Functionally, said pressure control valve is connected between said inlet passage (531) and said outlet passage (541), and said pressure control valve can connect or disconnect said inlet passage (531) and said outlet passage (541). For example, when said pressure sensor detects that the pressure in said inlet passage (531) is greater than a set value, said controller (41) opens said pressure control valve to realize pressure relief.

As shown in FIG. 6, the common rail (5) in the present invention is quite different from existing common rails for fuel injection. First of all, a lot of data analysis shows that the pressure which the common rail (5) of the present invention, applied in the urea spraying system, needs to withstand is far lower than what the common rail for fuel injection withstands. Based on such analysis, the cuboid shell (50) disclosed in the present invention has high machinability. More importantly, this provides a feasible solution for the integration of the outlet passage (541) into said common rail (5). In the illustrated implementation mode of the present invention, the diameter of said inlet passage (531) is of course greater than the diameter of said outlet passage (541). The reason for such a design is that scientific analysis shows that the pressures which said inlet passage (531) and said outlet passage (541) need to withstand are also different.

Figure 7:
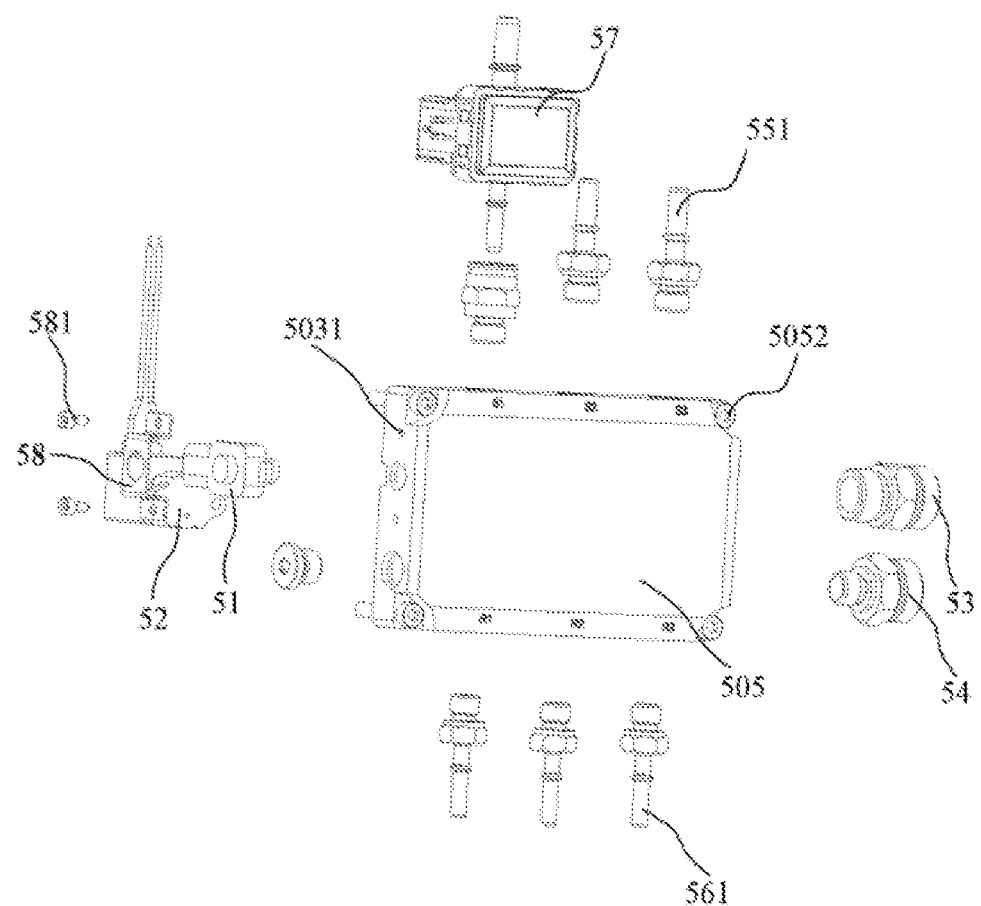
FIG. 7 is an exploded 3-D view of the common rail of the present invention with the mounting plates removed.

As shown in FIG. 7, said common rail (5) comprises a fastening piece (58) which is held on the outside of said pressure sensor (51), said fastening piece (58) is locked together with said threaded hole (5031) through a bolt (581) to fasten said pressure sensor (52) onto said shell (50).

The pressure control valve installed on said common rail (5) has three functions: 1. helping to build up the pressure in the urea pipeline, 2. stabilizing and controlling the pressure after the pressure is built up, 3. with the aid of contra-rotations of said pump (42), drawing the air in said urea tank (1) into the pipeline of said urea spraying system to evacuate the urea solution from said pipeline before said urea spraying system (100) stops.

To be specific, when the system just starts to build up pressure, a lot of air may exist in the pipeline. However, the compressibility of air easily leads to a pressure buildup failure. The pressure control valve designed in the present invention skillfully solves the problem. When the system just starts to build up pressure, said controller (41) controls the opening of said pressure control valve (for example, keeps said pressure control valve at a certain fixed opening angle or a variable opening angle) to connect said inlet passage (531) and said outlet passage (541) to provide one channel to release the air in the pipeline so that pressure can quickly be built up in the pipeline.

After the pressure buildup of the system is completed, said controller will quickly adjust the opening angle of said pressure control valve to ensure that the urea pressure in said common rail (5) is maintained around a set pressure and basically remains constant, thus achieving the aim of adjusting the pressure by controlling the return flow volume of the urea solution.

Before said urea spraying system (100) stops, said controller (41) opens said pressure control valve, said pump (42) contra-rotates to draw the air in said urea tank (1) into the pipeline of said urea spraying system to evacuate the urea solution from said pipeline. It should be noted that "before said urea spraying system (100) stops" means that said controller (41) has already received a signal indicating that the system is to stop. At this time, said nozzle (6) has already stopped spraying, but said pump (42) is still rotating (for example, contra-rotating). The purpose of evacuating the urea solution from said pipeline is to prevent the system from being damaged by freezing or expansion of the urea solution.

As shown in FIG. 6, said shell (50) further comprises said inlet passage (531) connected to the inlet connector (53), said outlet passage (541) connected to the outlet connector (54), at least one conveyance port (55) connected to said inlet passage (531), and at least one return flow port (56) connected to said outlet passage (541). Said inlet passage (531) and said outlet passage (541) pass through said first end face (501) and/or second end face (502). In the illustrated implementation mode of the present invention, said inlet passage (531) and said outlet passage (541) both pass through said first end face (501). Said inlet passage (531) and said outlet passage (541) are parallel to each other, thus facilitating machining. In the illustrated implementation mode of the present invention, a plurality of said conveyance ports (55) are provided. To be specific, three conveyance ports (55) and three conveyance connectors (551) connected to said conveyance ports (55) are set on said third end face (503). Each conveyance connector (551) is perpendicular to said inlet passage (531). Said three conveyance connectors (551) are arranged at intervals between said first end face (501) and second end face (502). In the illustrated implementation mode of the present invention, a urea mass sensor (57) is installed on the conveyance connector (551) close to said third end face (503). Of course, in other implementation modes, said urea mass sensor (57) can also be installed on any conveyance connector (551); or a urea mass sensor (57) can also be installed on all three conveyance connectors (551). In the illustrated implementation mode of the present invention, the number of said return flow ports (56) is also three, and said three return flow ports (56) and three return flow connectors (561) connected to said return flow ports (56) are set on said fourth end face (504). Each return flow connector (561) is perpendicular to said outlet passage (541). Said three return flow connectors (561) are also arranged at intervals between said first end face (501) and second end face (502). Said conveyance ports (55) run through said third end face (503), and said return flow ports (56) run through said fourth end face (504). The number of said return flow connectors (561) is the same as the number of said conveyance connectors (551), but their mounting directions are the opposite. Each conveyance port (55) is aligned with a corresponding return flow port (56).

In the illustrated implementation mode of the present invention, three of said nozzles (6) are provided. Each nozzle (6) is equipped with a conveyance pipeline (61) connected to said conveyance port (55) and a return flow pipeline (62) connected to said return flow port (56). With such settings, on the one hand, said nozzles (6) can spray a urea solution into said exhaust pipe (201) for a chemical reaction, and on the other hand, the urea solution flowing back can be utilized to cool said nozzles (6). The urea solution flowing back first gathers in said common rail (5) through the return flow pipeline (62), and then uniformly flows back to said urea tank (1) through the return flow pipeline (300). In the prior art, a solution where said return flow pipelines (62) are directly introduced into said urea tank (1) is usually adopted. In such a solution, each nozzle (6) requires an independent return flow pipeline (62), and thus the cost is very high. In addition, in the applications of the present invention, especially in the exhaust treatment system of a high-power engine, the pipelines between said urea tank (1) and said nozzles (6) are often long, and the existing return flow design cannot satisfy the requirements.

Figure 9:
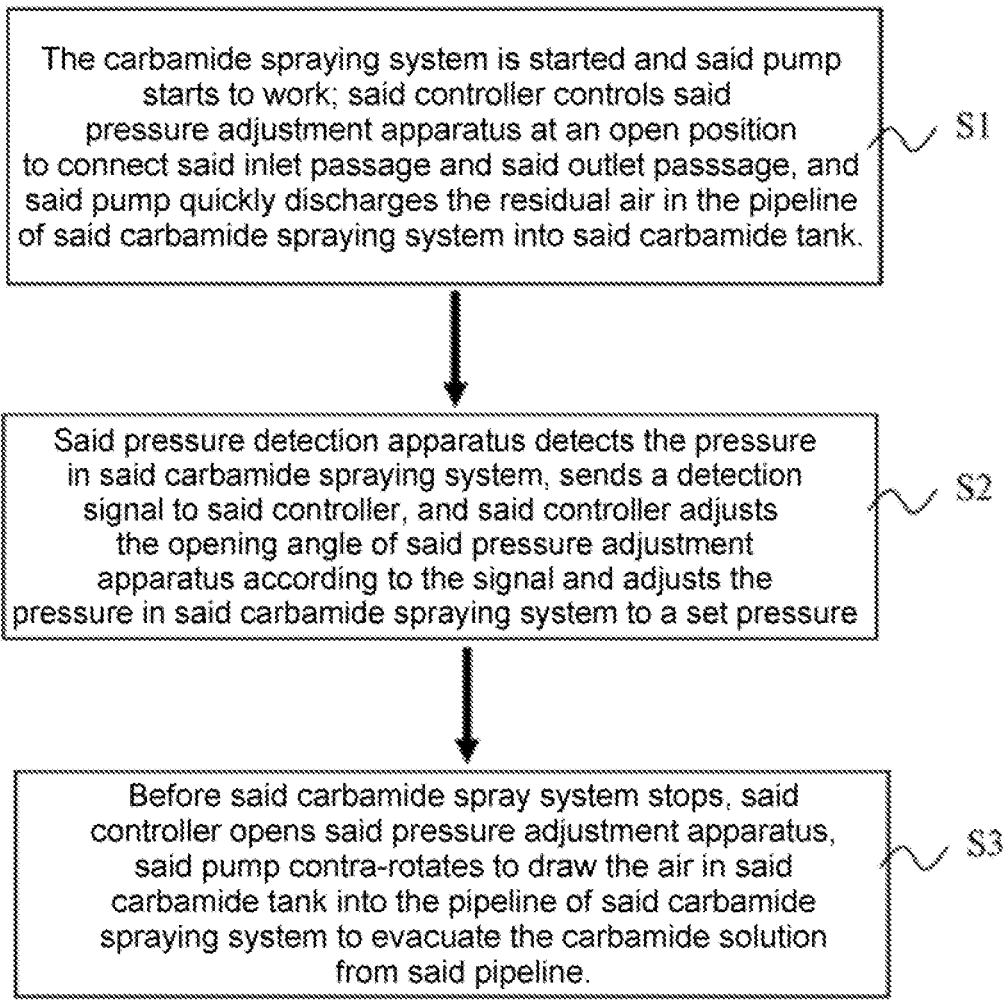
FIG. 9 is a flowchart of the control method of the urea spraying system of the present invention.
Figure 10:
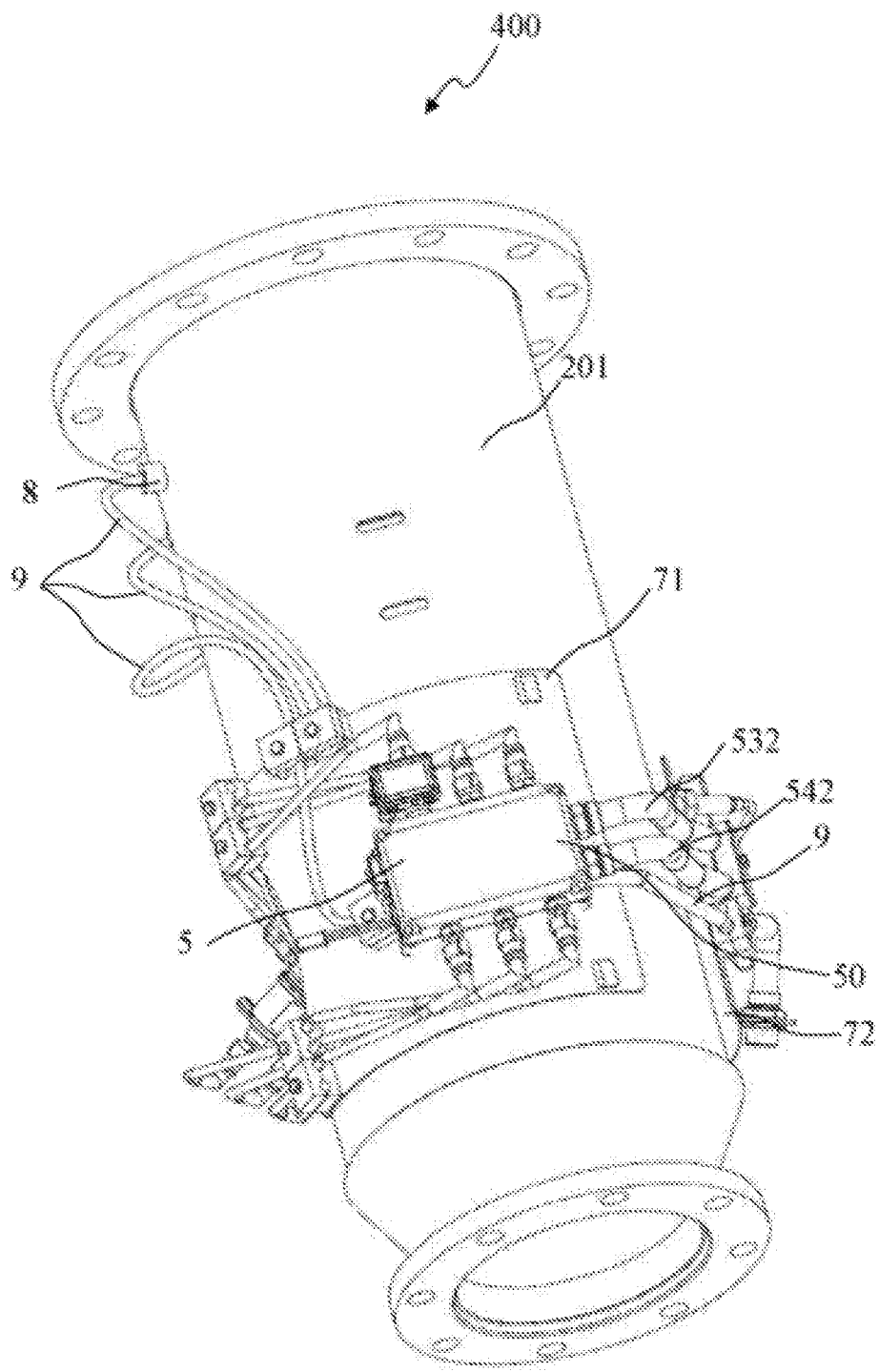
FIG. 10 is a 3-D view of an exhaust post-treatment assembly of the present invention, wherein said common rail is installed on the exhaust pipe.
Figure 11:
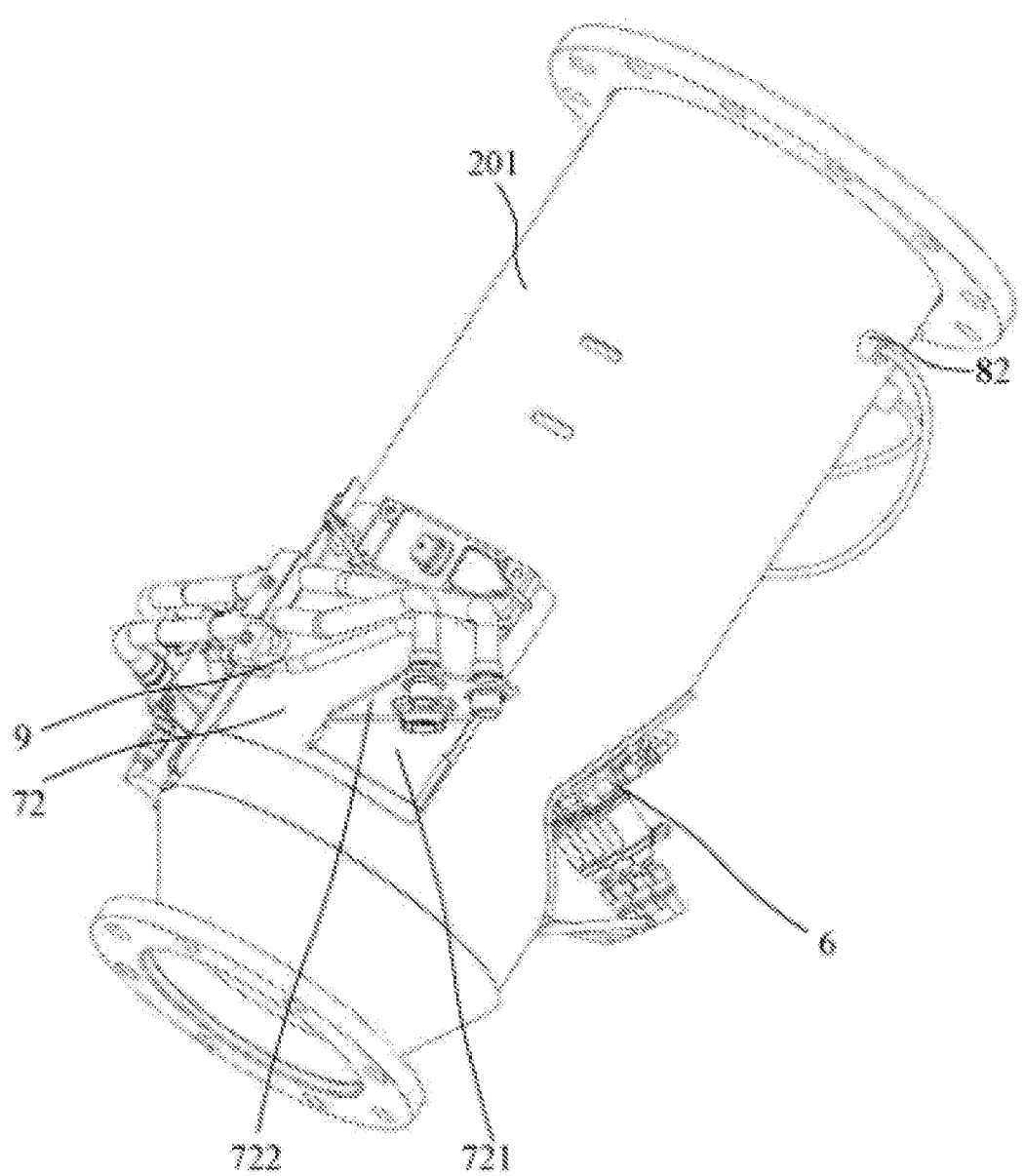
FIG. 11 is a 3-D view of another angle in FIG. 10.
Figure 12:
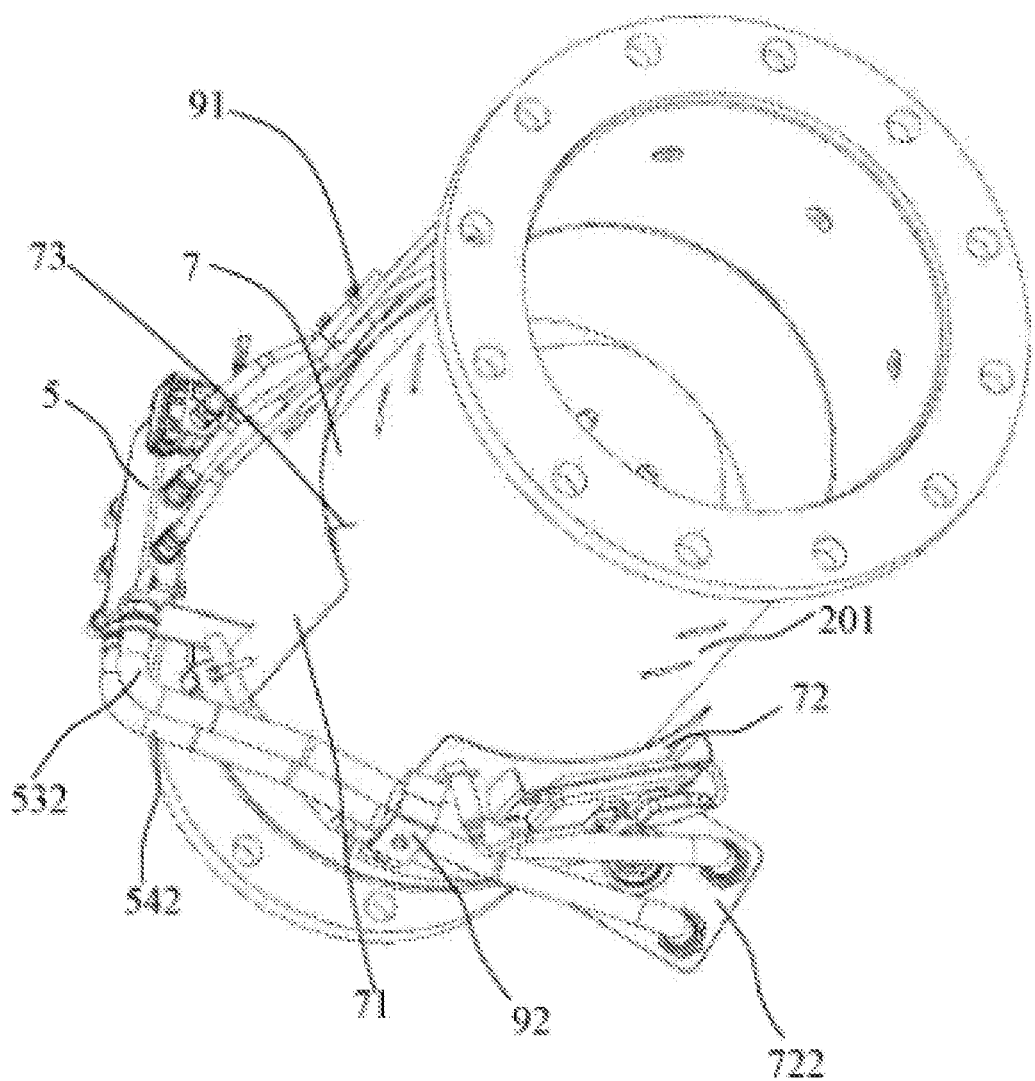
FIG. 12 is a 3-D view of another angle in FIG. 10.
Figure 13:
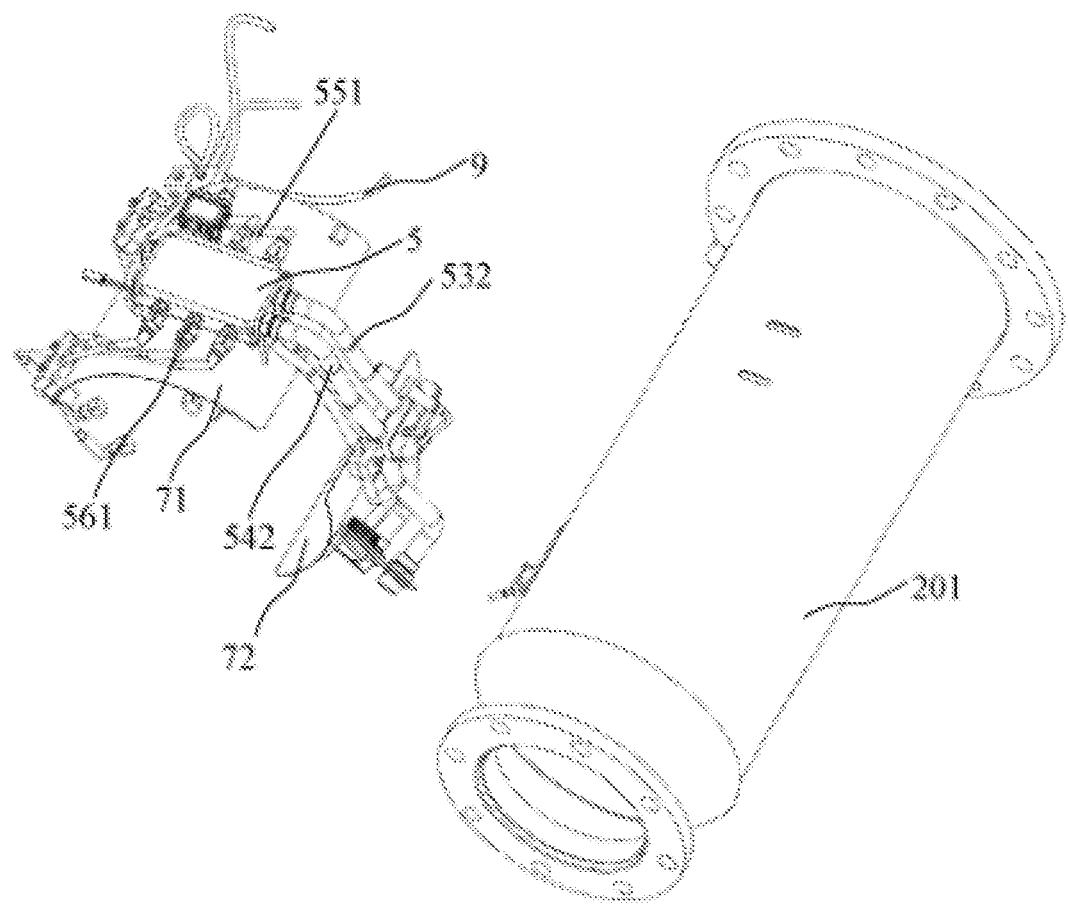
FIG. 13 is a local exploded view of the exhaust post-treatment assembly of the present invention.
Figure 14:
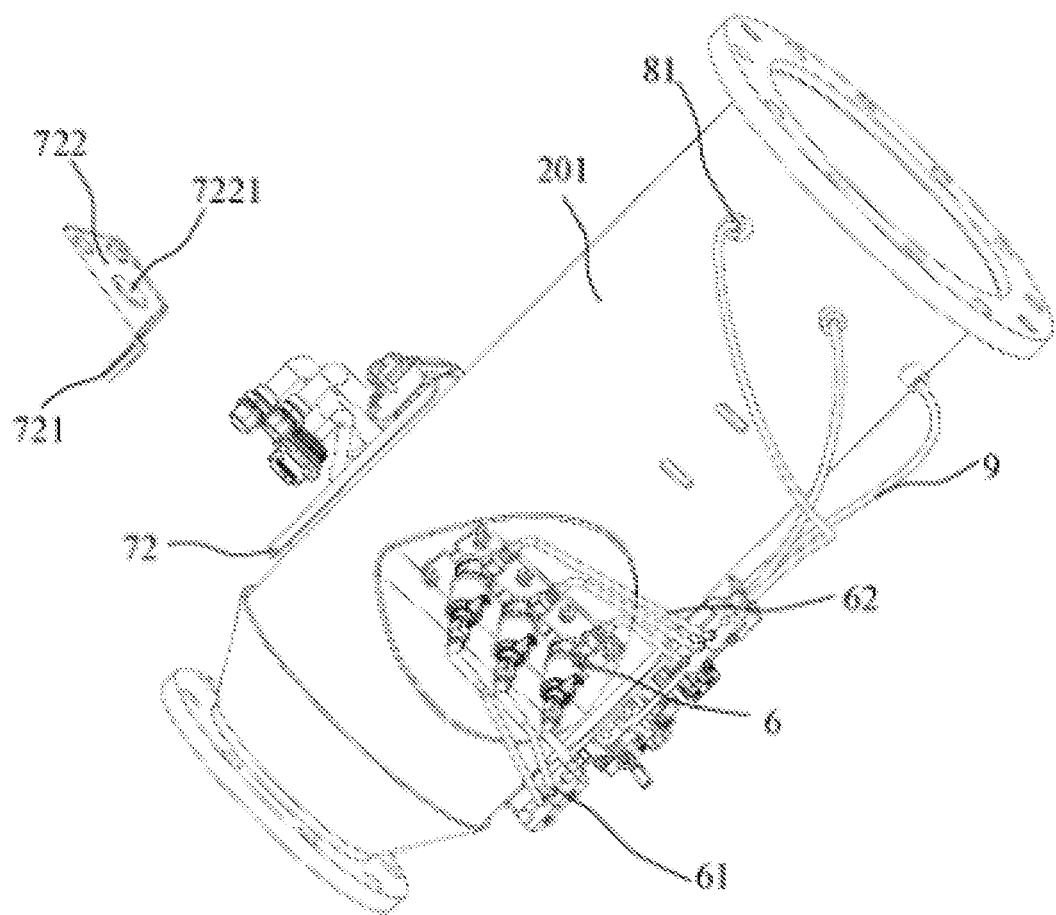
FIG. 14 is another local exploded view of the exhaust post-treatment assembly of the present invention.
Figure 15:
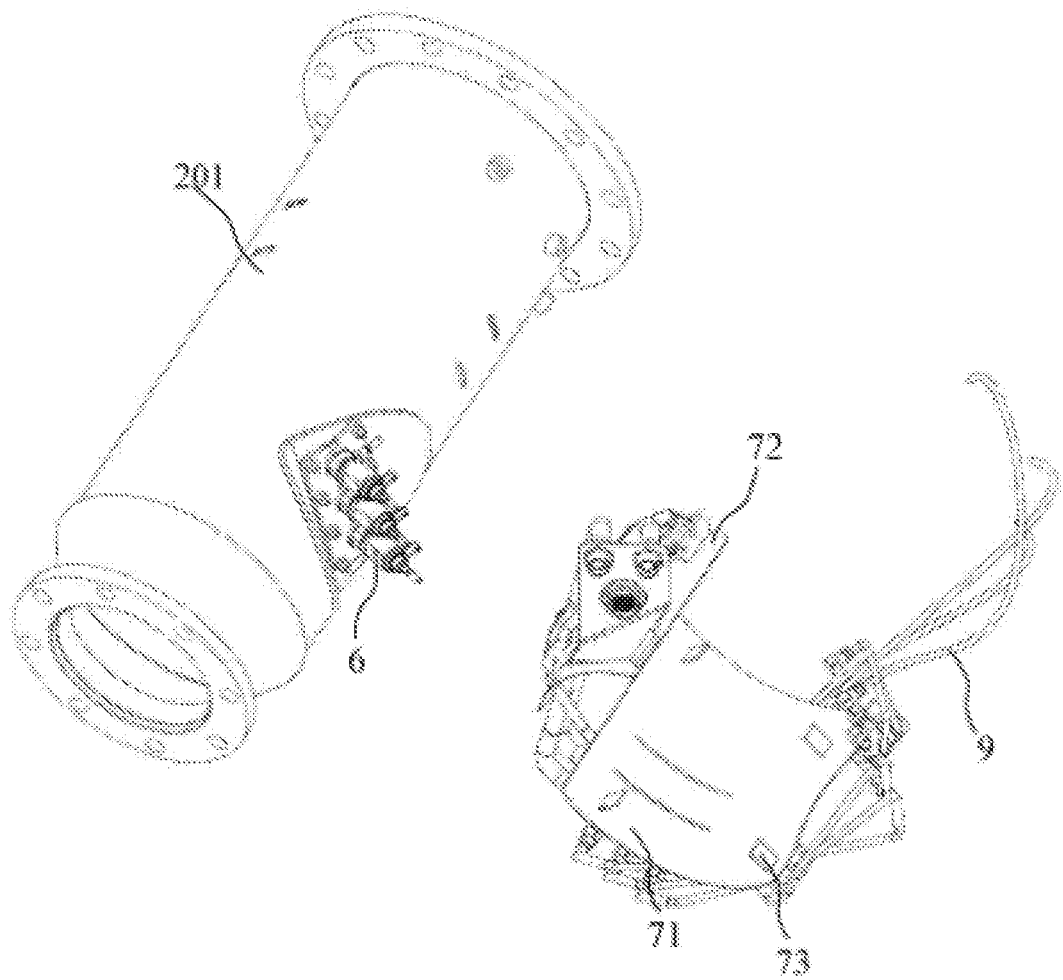
FIG. 15 is another local exploded view of the exhaust post-treatment assembly of the present invention.
Figure 16:
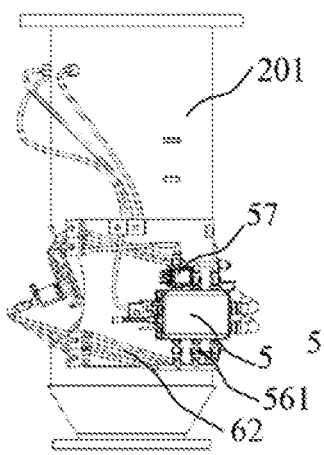
FIG. 16 is a top view of FIG. 10.
Figure 17:
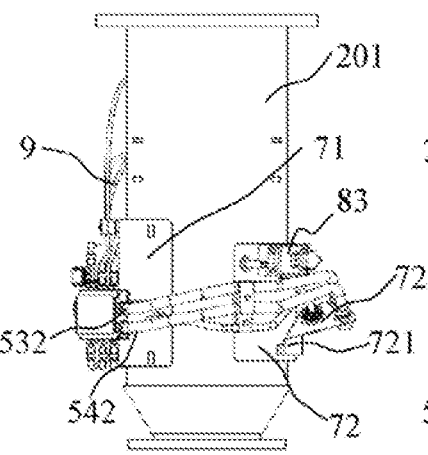
FIG. 17 is a right side view of FIG. 16.
Figure 18:
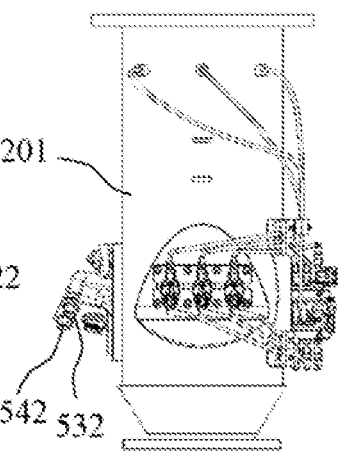
FIG. 18 is a left side view of FIG. 16.
Figure 19:
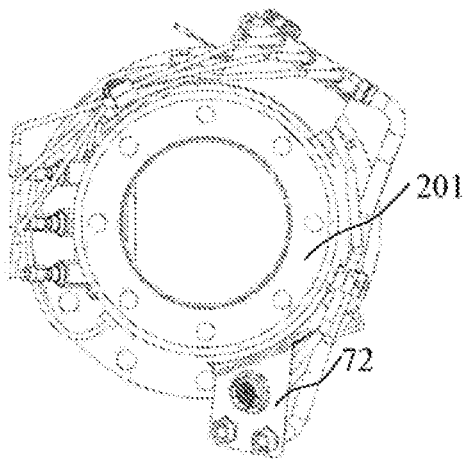
FIG. 19 is a front view of FIG. 10.
Figure 20:
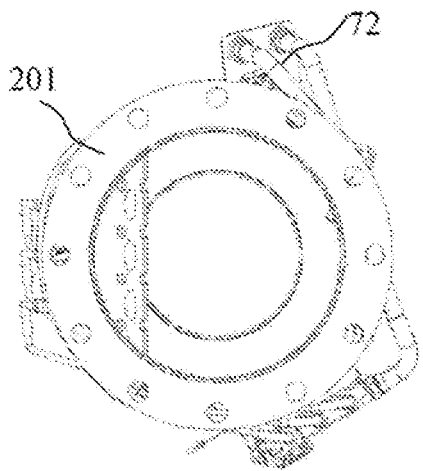
FIG. 20 is a rear view of FIG. 10.

As shown in FIG. 9, the present invention further relates to a control method of the above-mentioned urea spraying system (100) and the control method comprises the following steps:

S1: The urea spraying system (100) is started and said pump (42) starts to work; said pressure adjustment apparatus (52) is opened at a fixed angle or variable angle under the control of said controller (41) to connect said inlet passage (531) and said outlet passage 541); said pump (42) quickly discharges the residual air in the pipeline of said urea spraying system (100) into said urea tank (1) to realize quick pressure buildup.

S2: Said pressure detection apparatus (51) detects the pressure in said inlet passage (531), sends a detection signal to said controller (41), and said controller (41) adjusts the opening angle of said pressure adjustment apparatus (52) according to the signal and adjusts the pressure in said urea spraying system (100) to a set pressure.

S3: Before said urea spraying system (100) stops, said controller (41) opens said pressure adjustment apparatus (52), said pump (42) contra-rotates to draw the air in said urea tank (1) into the pipeline of said urea spraying system (100) to evacuate the urea solution from said pipeline.

As shown in FIG. 10 to FIG. 20, in the illustrated implementation mode of the present invention, said common rail (5) is installed onto said exhaust pipe (201) to form an exhaust post-treatment assembly (400). Said exhaust post-treatment assembly (400) comprises said exhaust pipe (201), a first support (71) installed on said exhaust pipe (201), said common rail (5) installed on said first support (71), an inlet pipeline (532) and an outlet pipeline (542) connected to said common rail (5), many types of sensors (8), a wiring harness (9) connected to said sensors (8), and a second support (72). Said inlet pipeline (532), said outlet pipeline (54), and said wiring harness (9) are all gathered to said second support (72) to facilitate the connection of said exhaust post-treatment assembly (400) with other assemblies.

Said exhaust post-treatment assembly (400) is also equipped with a mounting block (73) located between said first support (71) and said exhaust pipe (201). Said mounting block (73) is welded to said exhaust pipe (201), with a gap (7) reserved between said first support (71) and said exhaust pipe (201). Said gap (7) can relieve high-temperature transfer from the exhaust pipe (201) to said first support (71) to avoid said common rail (5) from being affected. Preferably, heat insulation cotton is filled in said gap (7). In addition, said common rail (5) is welded to said first support (71) with a pair of said mounting plates (5062), that is to say, said common rail (5) is separated from said exhaust pipe (201) a distance by said first support (71) to further relieve the effect of high-temperature on the exhaust pipe (201). Said second support (72) comprises a fixed portion (721) welded on said exhaust pipe (201) and a mounting portion (722) forming an included angle with said fixed portion (721). In the illustrated implementation mode of the present invention, said fixed portion (721) is perpendicular to said mounting portion (722). Said mounting portion (722) is equipped with a plurality of mounting holes (7221), and said wiring harness (9), said inlet pipeline (532), and said outlet pipeline are all gathered in a corresponding mounting hole (7221). Of course, in other implementation modes of the present invention, said fixed portion (722) can also indirectly be installed on said exhaust pipe (201) in other ways. In the illustrated implementation mode of the present invention, said fixed portion (721) and said mounting portion (722) are formed by wholly bending a metal plate. In the illustrated implementation mode of the present invention, said exhaust post-treatment assembly (400) is further equipped with cable clips (91) used to separate said wiring harness (9) and pipe clips (92) used to separate said pipelines or pipes.

Said sensors (8) include pressure sensors (81), temperature sensors (82), and nitrogen-oxygen sensors (83) connected to said wiring harness (9). Of course, the types of said sensors (8) can be flexibly selected according to the design requirements of the system, and will not be described here.

In summary, the structure and layout of the entire exhaust post-treatment assembly (400) are made clear by gathering said wiring harness (9), said inlet pipeline (532), and said outlet pipeline (542) onto the mounting portion (722) of said second support (72). In addition, the gathering of various interfaces greatly facilitates the installation of said exhaust post-treatment assembly (400) with other assemblies.

In addition, the above-mentioned embodiments are only used to describe the present invention, but do not restrict the technical solutions described for the present invention. The understanding of the specification, for example, "run through from front to back" (meaning "run through before other parts are installed"), and the description of directions such as front, back, left, right, top, and bottom, should be based on those skilled in the art. Although a detailed description of the present invention is given in the specification with reference to the above-mentioned embodiments, those skilled in the art should understand that a person skilled in the art can still make modifications to or equivalent replacements in the present invention. Technical solutions and improvements without departing from the spirit and scope of the present invention should all fall within the scope of the claims of the present invention.

The invention claimed is:

1. A common rail, used in a urea spraying system, wherein said common rail comprises a block, and a pressure detection apparatus and a pressure adjustment apparatus installed on said block; said block comprises an inlet passage where a urea solution can enter, an outlet passage where the urea solution can flow out, at least one conveyance port connected to said inlet passage, and at least one return flow port connected to said outlet passage; said pressure detection apparatus is connected to said inlet passage; said pressure adjustment apparatus is connected between said inlet passage and said outlet passage, and said pressure adjustment apparatus is able to connect or disconnect said inlet passage and said outlet passage, wherein said block roughly takes the shape of a cuboid, and comprises a first end face, a second end face, a third end face, and a fourth end face, wherein said first end face is set opposite said second end face, and said third end face is set opposite said fourth end face; said inlet passage and said outlet passage run through said first end face and/or second end face, said conveyance port runs through said third end face, and said return flow port runs through said fourth end face, wherein a plurality of said conveyance ports are provided, and said common rail is equipped with conveyance connectors connected to each conveyance port; a plurality of said return flow ports are provided, and said common rail is equipped with return flow connectors connected to each return flow port; wherein the number of said return flow connectors is the same as the number of said conveyance connectors.

2. The common rail as claimed in claim 1, wherein said conveyance connectors are arranged at intervals between said first end face and said second end face, said return flow connectors are also arranged at intervals between said first end face and said second end face, said conveyance connectors are in the opposite direction to said return flow connectors, and each conveyance port is aligned with the corresponding return flow port.

3. The common rail according to claim 1, wherein a urea mass sensor is installed on at least one conveyance connector.

4. The common rail as claimed in claim 1, wherein said inlet passage and said outlet passage are parallel to each other, said conveyance connector is perpendicular to said inlet passage, and said return flow connector is perpendicular to said outlet passage.

5. The common rail as claimed in claim 1, wherein said common rail comprises inlet connectors connected to said inlet passage and outlet connectors connected to said outlet passage.

6. The common rail as claimed in claim 5, wherein said pressure detection apparatus is a pressure sensor, said pressure sensor is installed on said second end face, and said inlet connector and said outlet connector are installed on said first end face and/or said second end face.

7. The common rail as claimed in claim 1, wherein said block further comprises a front face perpendicular to said first, second, third, and fourth end faces, and a back face opposite said front face, wherein a mounting groove used for mounting said pressure adjustment apparatus is set on said back face.

8. A common rail, used in a urea spraying system, wherein said common rail comprises a shell, and a pressure detection apparatus and a pressure adjustment apparatus installed on said shell; said shell comprises an inlet passage where a urea solution can enter, an outlet passage where the urea solution can flow out, at least one conveyance port connected to said inlet passage, and at least one return flow port connected to said outlet passage; said pressure detection apparatus is connected to said inlet passage; said pressure adjustment apparatus is connected between said inlet passage and said outlet passage, and said pressure adjustment apparatus is able to connect or disconnect said inlet passage and said outlet passage, wherein said shell roughly takes the shape of a cuboid, and comprises a first end face, a second end face, a third end face, and a fourth end face, wherein said first end face is set opposite said second end face, and said third end face is set opposite said fourth end face; said inlet passage and said outlet passage run through said first end face and/or second end face, said conveyance port runs through said third end face, and said return flow port runs through said fourth end face, wherein said common rail comprises inlet connectors connected to said inlet passage and outlet connectors connected to said outlet passage, wherein said pressure detection apparatus is a pressure sensor, said pressure sensor is installed on said second end face, and said inlet connector and said outlet connector are installed on said first end face and/or said second end face, wherein said second end face is equipped with a threaded hole, said common rail comprises a fastening piece which is held on the outside of said pressure sensor, and said fastening piece is locked together with said threaded hole through a bolt to fasten said pressure sensor onto said shell.

9. A common rail, used in a urea spraying system, wherein said common rail comprises a block, and a pressure detection apparatus and a pressure adjustment apparatus installed on said block; said block comprises an inlet passage where a urea solution can enter, an outlet passage where the urea solution can flow out, at least one conveyance port connected to said inlet passage, and at least one return flow port connected to said outlet passage; said pressure detection apparatus is connected to said inlet passage; said pressure adjustment apparatus is connected between said inlet passage and said outlet passage, and said pressure adjustment apparatus is able to connect or disconnect said inlet passage and said outlet passage, wherein said block roughly takes the shape of a cuboid, and comprises a first end face, a second end face, a third end face, and a fourth end face, wherein said first end face is set opposite said second end face, and said third end face is set opposite said fourth end face; said inlet passage and said outlet passage run through said first end face and/or second end face, said conveyance port runs through said third end face, and said return flow port runs through said fourth end face, wherein said block further comprises a front face perpendicular to said first, second, third, and fourth end faces, and a back face opposite said front face, wherein a mounting hole is provided at each of the four corners of said front face.

10. A control method of a urea spraying system used for treating exhaust of engines, said urea spraying system comprising a urea tank, a fluid conveyance apparatus used to pump out urea solution in said urea tank, a common rail connected to said fluid conveyance apparatus, nozzles connected to said common rail, an outlet passage connected to said common rail, a return flow pipeline connected to said urea tank, and a controller, said fluid conveyance apparatus comprising a pump used to pump a urea solution, said common rail comprising, a block, and a pressure detection apparatus and a pressure adjustment apparatus installed on said block; said block comprises an inlet passage where a urea solution can enter, an outlet passage where the urea solution can flow out, at least one conveyance port connected to said inlet passage, and at least one return flow port connected to said outlet passage; said pressure detection apparatus is connected to said inlet passage; said pressure adjustment apparatus is connected between said inlet passage and said outlet passage and said pressure adjustment apparatus is able to connect or disconnect said inlet passage and said outlet passage, wherein said nozzles are equipped with conveyance pipelines connected to said conveyance ports, and said return flow pipeline connected to said return flow ports, comprising the following steps:

S1: Starting said pump, opening said pressure adjustment apparatus to connect said inlet passage and said outlet passage, and said pump quickly discharging the residual air in the pipeline of said urea spraying system into said urea tank, S2: detecting the pressure in said inlet passage via said pressure detection apparatus, sending a detection signal to said controller, and said controller adjusting the opening angle of said pressure adjustment apparatus according to the signal and adjusting the pressure in said urea spraying system to a set pressure.

11. The control method as claimed in claim 10, further comprising the following step after Step S2:

S3: Opening said pressure adjustment apparatus via said controller, contra-rotating said pump to draw the air in said urea tank into the pipeline of said urea spraying system to evacuate the urea solution from said pipeline, before said urea spray system stops.

* * * * *